(12) United States Patent
Yoshida et al.

(10) Patent No.: US 6,188,161 B1
(45) Date of Patent: *Feb. 13, 2001

(54) DRIVING APPARATUS USING TRANSDUCER

(75) Inventors: Ryuichi Yoshida, Sakai; Yasuhiro Okamoto, Tondabayashi, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/088,636

(22) Filed: Jun. 2, 1998

(30) Foreign Application Priority Data

Jun. 2, 1997 (JP) .................................................. 9-143998

(51) Int. Cl.[7] .................................................. H01L 41/08
(52) U.S. Cl. ........................................ 310/328; 310/323.02
(58) Field of Search ............................. 310/328, 323.02, 310/323.17

(56) References Cited

U.S. PATENT DOCUMENTS

| 3,684,904 | * | 8/1972 | Galutva et al. ................ 310/328 |
| 3,902,084 | * | 8/1975 | May, Jr. ......................... 310/328 |
| 3,902,085 | * | 8/1975 | Bizzigotti ....................... 310/328 |
| 4,219,755 | * | 8/1980 | O'Neill et al. ............... 310/328 X |
| 4,408,832 | * | 10/1983 | Hartman et al. ............. 310/328 X |
| 4,570,096 | * | 2/1986 | Hara et al. ..................... 310/328 |
| 4,736,131 | * | 4/1988 | Fujimoto ....................... 310/328 |
| 4,857,791 | * | 8/1989 | Uchino et al. ........... 310/323.02 X |
| 4,874,979 | * | 10/1989 | Rapp ............................ 310/328 |
| 5,225,941 |  | 7/1993 | Saito et al. ..................... 359/824 |
| 5,319,257 | * | 6/1994 | McIntyre ....................... 310/328 |
| 5,465,021 | * | 11/1995 | Visscher et al. ............... 310/328 |
| 5,589,723 |  | 12/1996 | Yoshida et al. ................ 310/328 |
| 5,712,524 | * | 1/1998 | Suga ....................... 310/323.02 X |
| 5,786,654 | * | 7/1998 | Yoshida et al. ................ 310/328 |
| 5,907,212 | * | 5/1999 | Okada ........................... 310/328 |
| 5,912,527 | * | 6/1999 | Karrai ........................... 310/328 |

FOREIGN PATENT DOCUMENTS

| 0022478 | * | 2/1985 | (JP) ............................. 310/328 |
| 0114477 | * | 5/1987 | (JP) ......................... 310/323.02 |
| 0321875 | * | 12/1989 | (JP) ......................... 310/323.02 |
| 40-6113564 | * | 4/1994 | (JP) ......................... 310/323.02 |
| 0873271 | * | 10/1981 | (SU) ............................ 310/328 |

* cited by examiner

*Primary Examiner*—Mark O. Budd
(74) *Attorney, Agent, or Firm*—Sidley & Austin (57) ABSTRACT

A driving apparatus includes an electromechanical transducer that is connected to a drive pulse generating means and that expands and contracts, a driven member that is connected to one end of the transducer, a friction member that is connected to the other end of the transducer and a guide unit that is in frictional contact with the friction member. The friction member has an elastic deforming mechanism that elastically presses against and comes into frictional contact with the guide unit, and the elastic deforming mechanism is constructed such that its elastic deformation stress vector perpendicularly crosses the directions of expansion and contraction of the transducer.

17 Claims, 9 Drawing Sheets

DRIVING APPARATUS USING TRANSDUCER

This application is based on application No. Hei 9-143998 filed in Japan, the content of which is hereby incorporated by reference.

BACKGROUND OF THE INVENTION

1. Field of the Invention

The present invention pertains to a driving apparatus that uses as a drive source a member that expands and contracts, and more particularly, to a driving apparatus that employs an electromechanical transducer such as a piezoelectric element, e.g., to a driving apparatus used for the precision driving of an X-Y drive table, a camera image recording lens, or a probe of a scanning tunneling electron microscope.

2. Description of the Related Art

Figures 1, 2, 3:
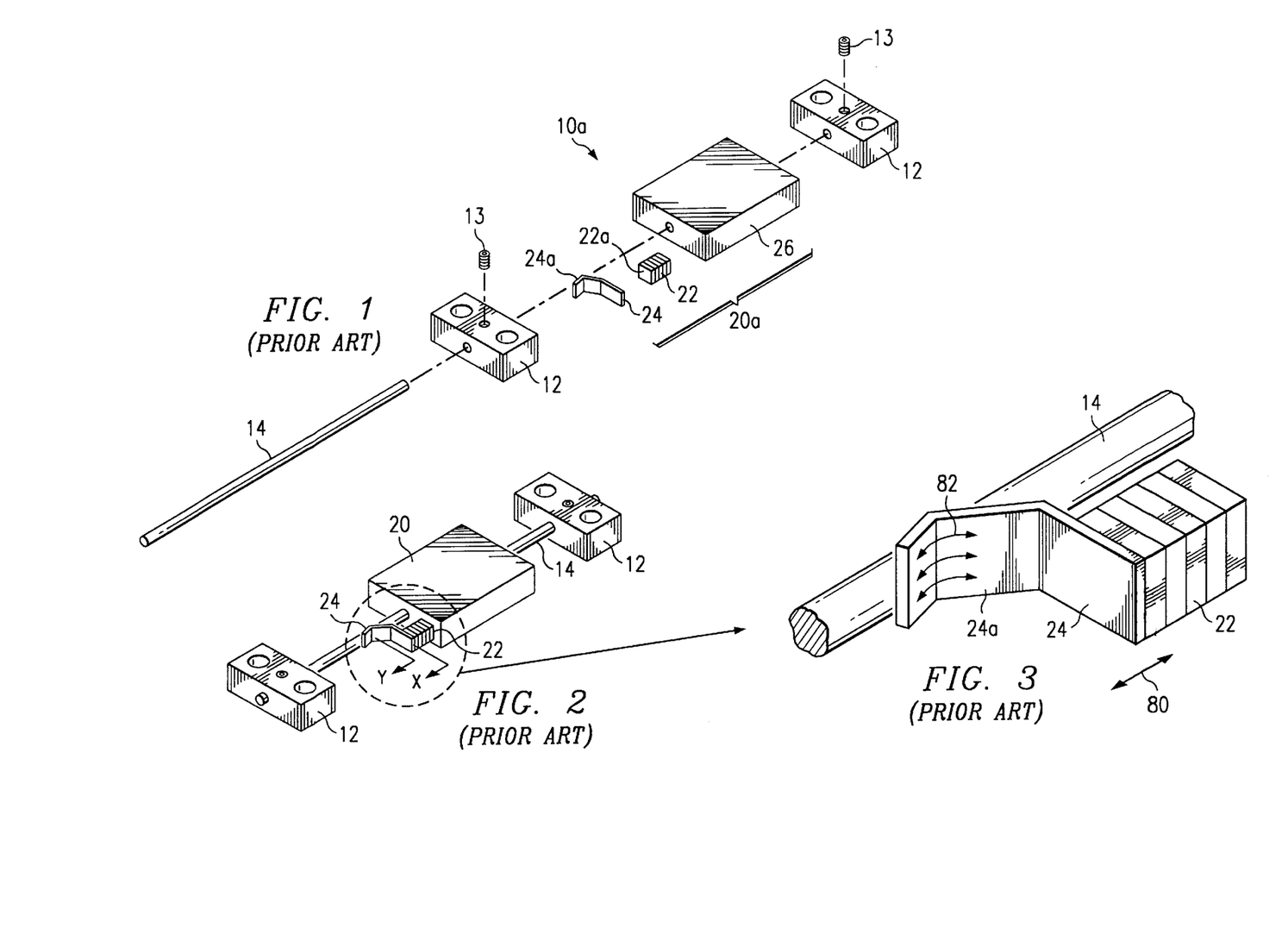
FIG. 1 is an exploded perspective view of a conventional driving apparatus.
FIG. 2 is an overall perspective view of the driving apparatus shown in FIG. 1.
FIG. 3 is a partial enlargement of the frictional contact area of the driving apparatus shown in FIG. 1.
Figures 4, 5:
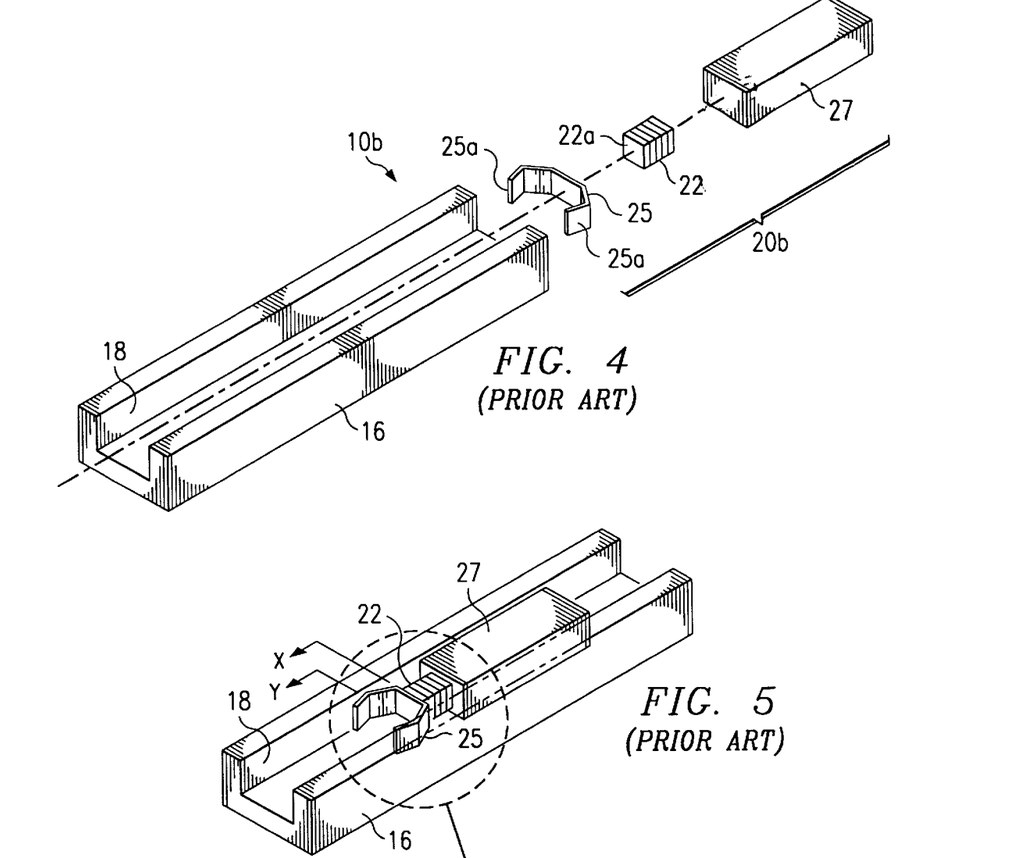
FIG. 4 is an exploded perspective view of a conventional driving apparatus.
FIG. 5 is an overall perspective view of the driving apparatus shown in FIG. 4.
Figure 6:
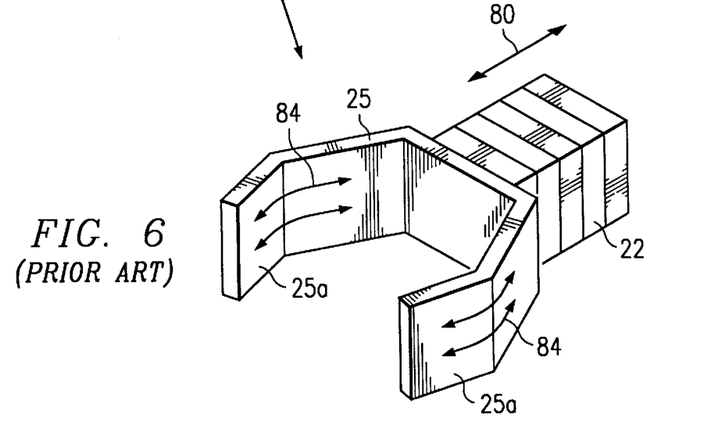
FIG. 6 is a partial enlargement of the frictional contact area of the driving apparatus shown in FIG. 4.

Conventional examples of a driving apparatus using a piezoelectric element include driving apparatus 10a in which movable unit 20a moves along shaft 14, as shown in FIGS. 1 through 3, and driving apparatus 10b in which movable unit 20b moves along guide groove 18, as shown in FIGS. 4 through 6. In these driving apparatuses 10a and 10b, an elastic deforming mechanism is constructed by pressing protrusion 24a or 25a of plate spring 24 or 25, which is a friction member connected to one end of piezoelectric element 22, against the outer surface of shaft 14 or against the inner surface of guide groove 18, such that a frictional force may be created. A driving apparatus of the type in which the friction member has an elastic deforming mechanism which creates frictional force is superior to a driving apparatus of the type in which a frictional force is created by applying external force to the friction member by means of a spring member, as shown in U.S. Pat. No. 5,589,723, in that the construction may be simplified.

In either driving apparatus 10a or 10b, the elastic deformation stress vector that occurs during the elastic deformation of protrusion 24a or 25a of plate spring 24 or 25 runs in the directions indicated by bi-directional arrow 82 or 84 in FIG. 3 or 6, where stress is applied that has a component that works in the directions of expansion and contraction of piezoelectric element 22, as shown by bi-directional arrow 80. In other words, deflection occurs in plate spring 24 or 25, the friction member, in the directions of expansion and contraction of piezoelectric element 22, between the area that is fixed to piezoelectric element 22 and the area that is in frictional contact with shaft 14 or guide groove 18, and plate spring 24 or 25 elastically deforms in expansion and contraction directions 80 of piezoelectric element 22.

Figure 7:
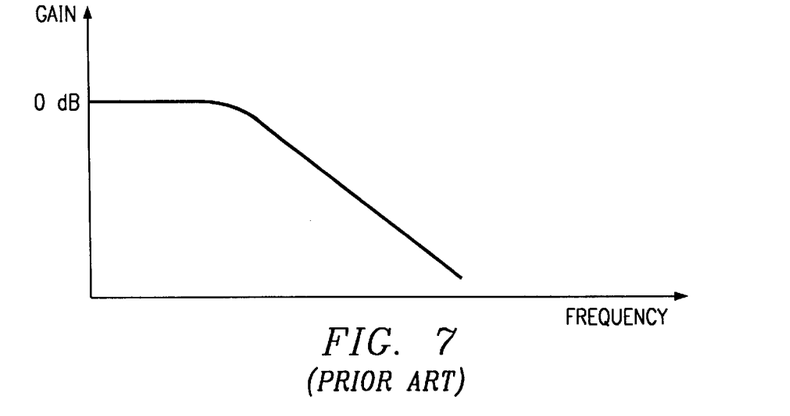
FIG. 7 is a graph showing the frequency-gain relationship in a conventional driving apparatus.
Figure 8:
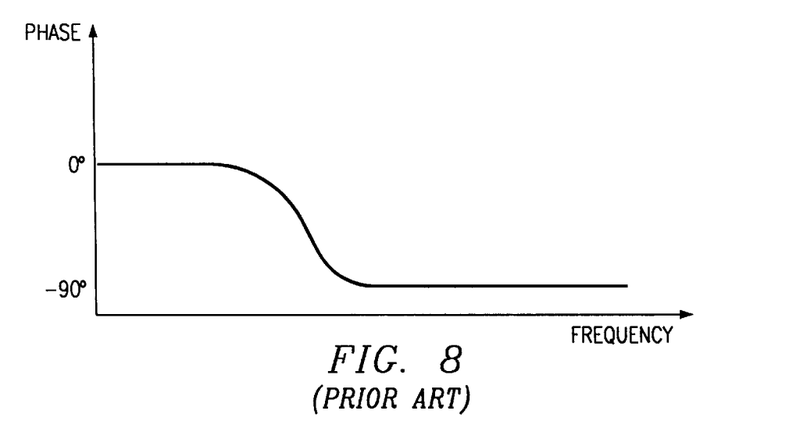
FIG. 8 is a graph showing the frequency-phase relationship in a conventional driving apparatus.
Figure 9:
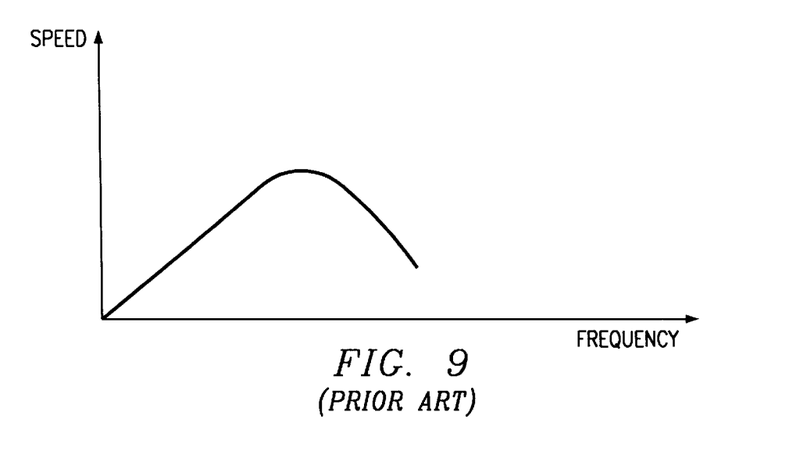
FIG. 9 is a graph showing a frequency-speed relationship in a conventional driving apparatus.

Therefore, if the frequency of the pulse voltage that is applied to piezoelectric element 22 is increased in order to move movable unit 20a or 20b of driving apparatus 10a or 10b at a high rate of speed, the change in position that occurs at one end 22a of piezoelectric element 22 can no longer be communicated to the frictional contact point via plate spring 24 or 25 in the same manner as before. FIGS. 7 and 8 are graphs that show the transfer function G=Y/X, i.e., the relationship between the transfer of the change in position X of piezoelectric element 22 and the change in position Y of the frictional contact point between friction member 24 or 25 and shaft 14 or groove 18. In other words, as shown in FIGS. 7 and 8, when the frequency increases, the gain decreases and the phase changes. Therefore, as shown in FIG. 9, with conventional driving apparatuses 10a and 10b, when the frequency increases to a certain level, the drive speed of movable units 20a and 20b decreases, as a result of which the drive speed cannot be increased by increasing the frequency.

SUMMARY OF THE INVENTION

The technological issue to be resolved by the present invention, therefore, is to improve the frequency characteristic of the transfer function governing the relationship between the change in position of the piezoelectric element and the change in position of the friction member's frictional contact point, so as to provide a driving apparatus capable of high speed driving in a high frequency range.

The present invention provides a driving apparatus having the following construction in order to resolve the technological issue described above.

The driving apparatus comprises (i) an electromechanical transducer that is connected to a drive pulse generating means and that expands and contracts, (ii) a first unit that is either fixed or movable and that is connected to one expansion end of said electromechanical transducer, (iii) a friction member that is connected to the other expansion end of said electromechanical transducer, and (iv) a second unit that is either movable or fixed that comes into frictional contact with said friction member, wherein said friction member has an elastic deforming mechanism that elastically presses against and comes into frictional contact with said second unit, said electromechanical transducer is expanded or contracted by means of said drive pulse generating means such that it drives said movable unit in a prescribed direction relative to said fixed unit, and said elastic deforming mechanism is constructed such that its elastic deformation stress vector vertically crosses the directions of expansion and contraction of said electromechanical transducer.

In the construction described above, the fixed unit is fixed and the movable unit may move relative to the fixed unit. In the driving apparatus, the electromechanical transducer slowly changes its position in a first direction and said second unit which is either movable or fixed, changes its position in the first direction due to the electrostatic friction between itself and the friction member, but when the electromechanical transducer suddenly changes its position in a second direction, the inertial force of the second unit overcomes the frictional force between itself and the friction member, causing the second unit to slip, as a result of which only the friction member returns to the original position, for example. Step driving of the driving apparatus can be achieved by repeating this process. Where the movable unit is fixed to one expansion end of the electromechanical transducer, to perform driving it is necessary for the mass of the movable unit to be smaller than the mass of the friction member that is fixed to the other expansion end of the electromechanical transducer.

Using the construction described above, the elastic deforming mechanism elastically deforms in directions that are perpendicular to the directions of expansion and contraction of the electromechanical transducer and does not deform in directions that are parallel to said directions of expansion and contraction. Consequently, the change in position of the electromechanical transducer caused by its expansion and contraction may be directly communicated to the frictional contact point of the friction member even when the driving frequency applied to the electromechanical transducer increases.

Therefore, the frequency characteristic of the function governing the transfer of the change in position of the piezoelectric element to the change in position of the friction member's frictional contact point may be improved and high-speed driving in the high frequency range becomes possible.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Driving apparatuses in which the present invention is applied are explained below with reference to the accompanying drawings.

Driving apparatus 10s, a first embodiment, of the type in which driving occurs along a shaft, will first be explained.

Figures 10, 11, 12:
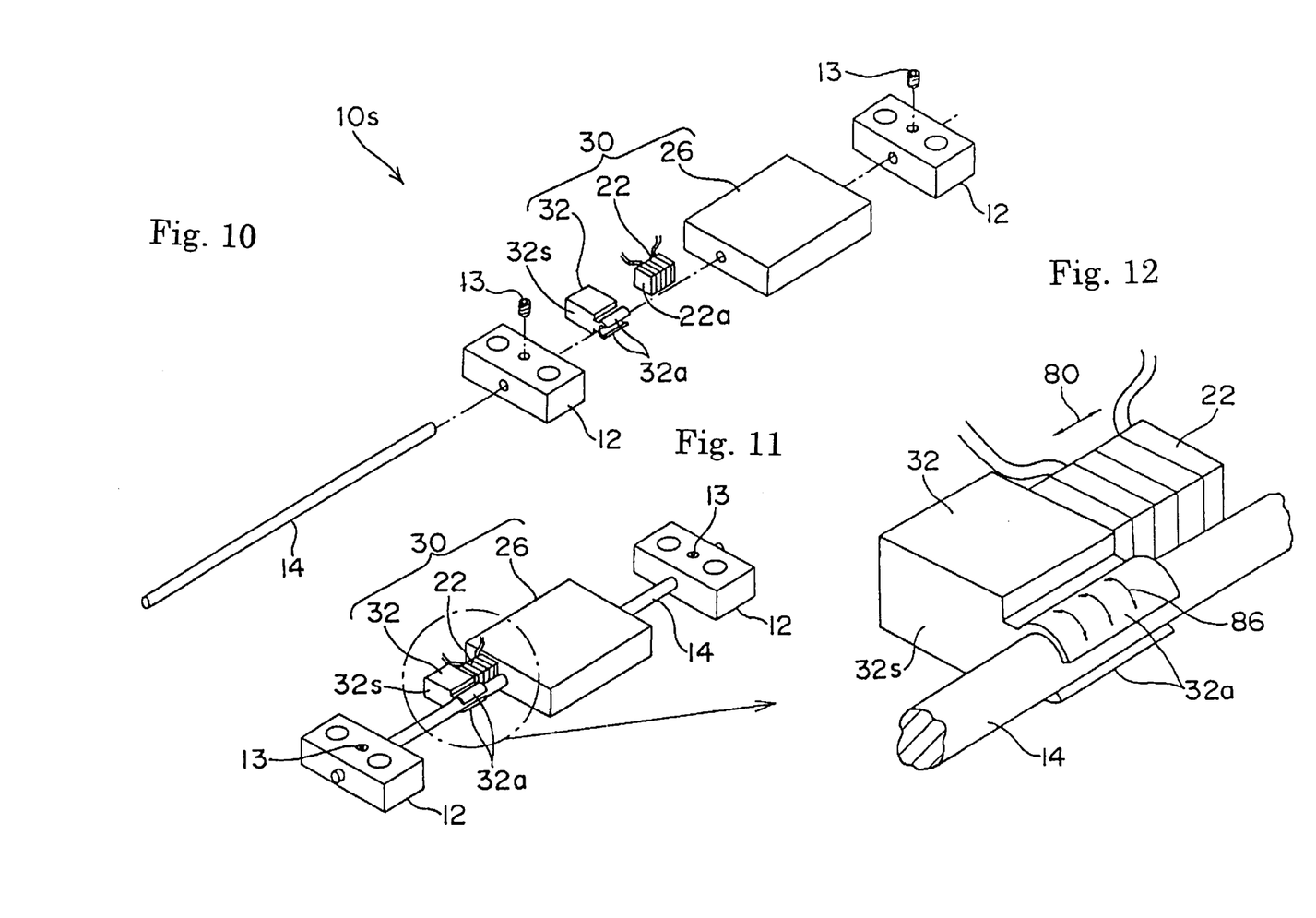
FIG. 10 is an exploded perspective view of a driving apparatus of a first embodiment pertaining to the present invention.
FIG. 11 is an overall perspective view of the driving apparatus shown in FIG. 10.
FIG. 12 is a partial enlargement of the frictional contact area of the driving apparatus shown in FIG. 10.

As shown in the exploded perspective view of FIG. 10 and the assembled perspective view of FIG. 11, this driving apparatus 10s is constructed in essentially the same manner as driving apparatus 10a, the conventional example shown in FIG. 1. In other words, in driving apparatus 10s, shaft 14 is fixed by means of screws 13 in a pair of fixed blocks 12 that are fixed onto a base, and movable unit 30 is movably supported by shaft 14.

Movable unit 30 comprises (i) movable member 26 that is movably supported by shaft 14, (ii) piezoelectric element 22 located such that one expansion end is connected to one end of movable member 26 and its direction of layering is parallel to the axis of shaft 14, and (iii) friction member 32 that is connected to the other expansion end of piezoelectric element 22 and is aligned in the direction of shaft 14. Friction member 32 is a block member having a construction different from that of plate spring 24 of the conventional driving apparatus 10a. That is, friction member 32 comprises main body or driving member 32s that is connected to piezoelectric element 22 and a pair of semi-cylindrical protrusions 32a that protrude toward shaft 14 from a side of main body 32s. The pair of protrusions 32a elastically grasp shaft 14 from both above and below, as shown in FIG. 11, and are in frictional contact with shaft 14. When protrusions 32a grasp shaft 14, an elastic deformation stress vector occurs along the circumference of the shaft, as indicated by arrows 86 in the partial enlargement of FIG. 12. Directions 86 in which the stress runs are essentially perpendicular to the directions of expansion and contraction of piezoelectric element 22 indicated by bi-directional arrow 80.

Therefore, because friction member 32 does not elastically deform in directions that are parallel to the directions of expansion and contraction of piezoelectric element 22, the change in position of piezoelectric element 22 due to its expansion or contraction can be accurately transmitted to the frictional contact point even when the driving frequency increases.

A driving apparatus of a second embodiment pertaining to the present invention will now be explained.

In driving apparatus 10s of the first embodiment described above, the frictional contact point is not in the line of force governing the expansion and contraction of piezoelectric element 22, and consequently, moment is applied to connection surface 22a between piezoelectric element 22 and friction member 32, but this moment can be removed in the second embodiment.

Figure 13:
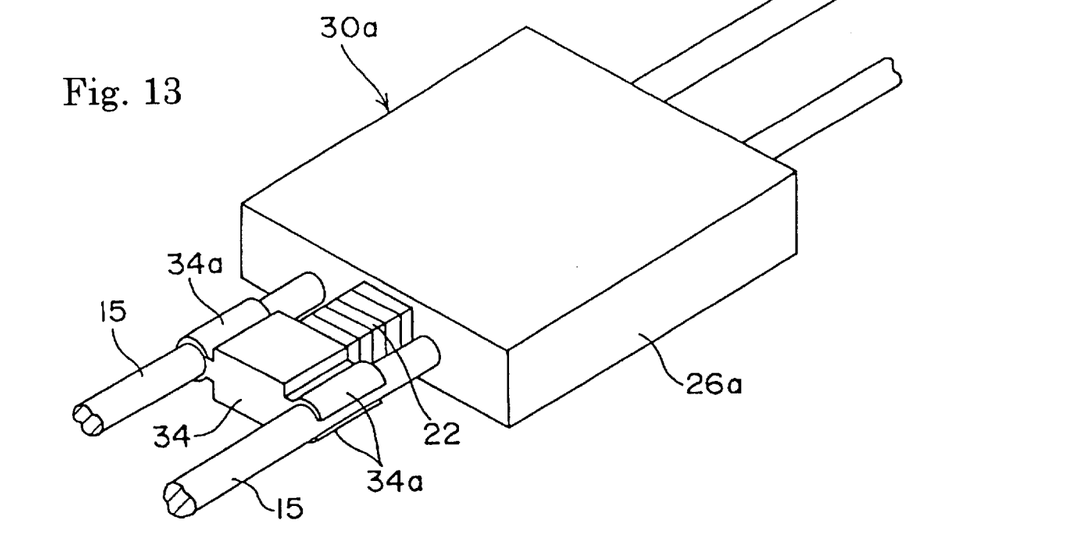
FIG. 13 is a perspective view of the important components of a driving apparatus of a second embodiment pertaining to the present invention.

FIG. 13 is an enlargement of the important components of driving apparatus 30a using two shafts 15. This driving apparatus of the second embodiment has a pair of parallel shafts 15, and movable member 26a is movably supported on them. Piezoelectric element 22 and friction member 34 are located between the pair of shafts 15. Friction member 34 is a driving member with two pairs of protrusions 34a that grasp a respective shaft 15 on either side. In this driving apparatus 30a, frictional contact areas at which friction member 34 engages with shafts 15 exist on either side of piezoelectric element 22, and consequently, the moment that is applied to piezoelectric element 22 by each frictional contact area is kept in balance by the other, and consequently no net moment works on piezoelectric element 22.

Figure 14:
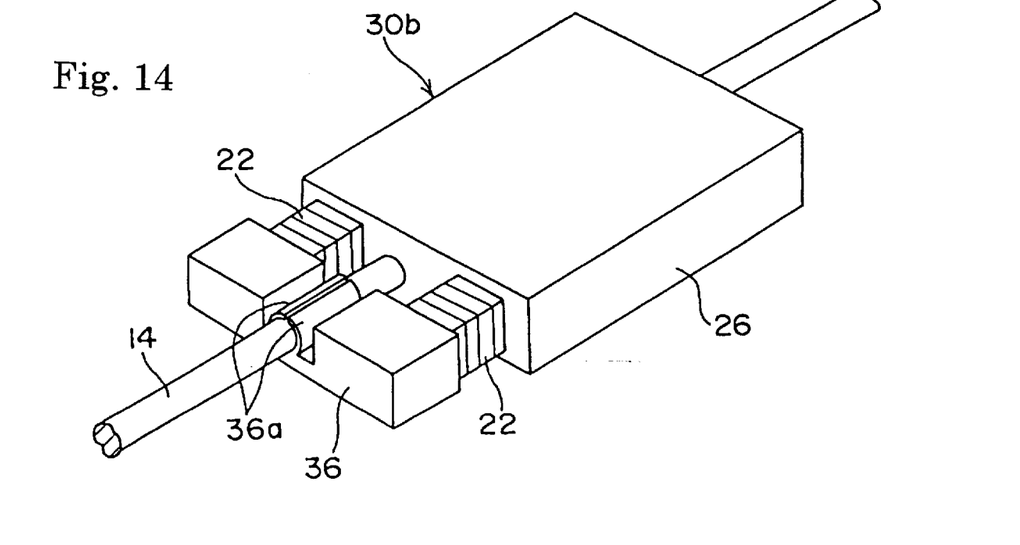
FIG. 14 is a perspective view of the important components of a driving apparatus of a third embodiment pertaining to the present invention.

FIG. 14 is an enlargement of the important components of driving apparatus 30b of a third embodiment, using two piezoelectric elements 22. This driving apparatus of the third embodiment has a single shaft 14, and movable member 26 is movably supported by this shaft 14. Two piezoelectric elements 22 are located one on either side of shaft 14, and one expansion end of each piezoelectric element 22 is connected to one end of movable member 26. Friction member 36, which is located such that it crosses shaft 14, is connected to the other expansion end of the two piezoelectric elements 22. Friction member 36 has a pair of protrusions 36a at its center that grasp shaft 14. In this variation, the two piezoelectric elements 22 expand and contract synchronously and move friction member 36 along the shaft 14. Therefore, no net moment works on piezoelectric elements 22.

Figure 15:
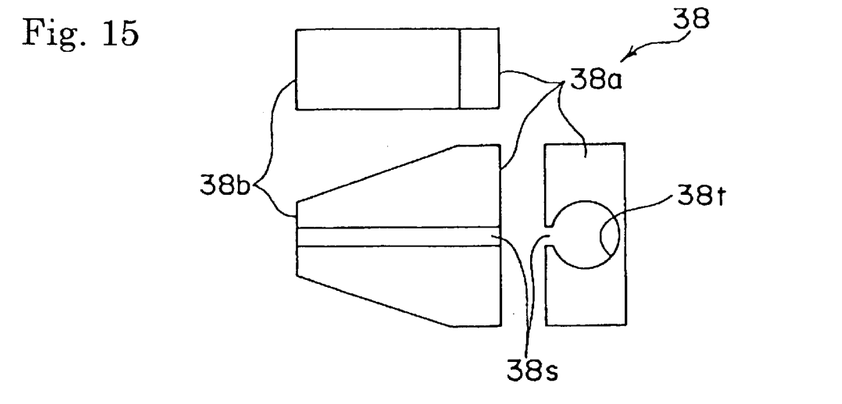
FIG. 15 is a drawing showing three sides of a friction member of a fourth embodiment pertaining to the present invention.
Figure 16:
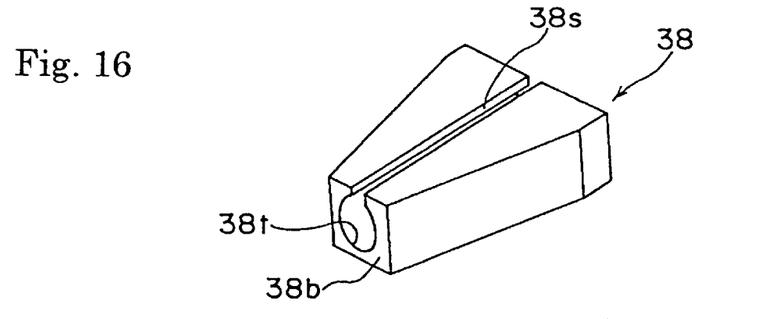
FIG. 16 is a perspective view of the friction member shown in FIG. 15.
Figure 17:
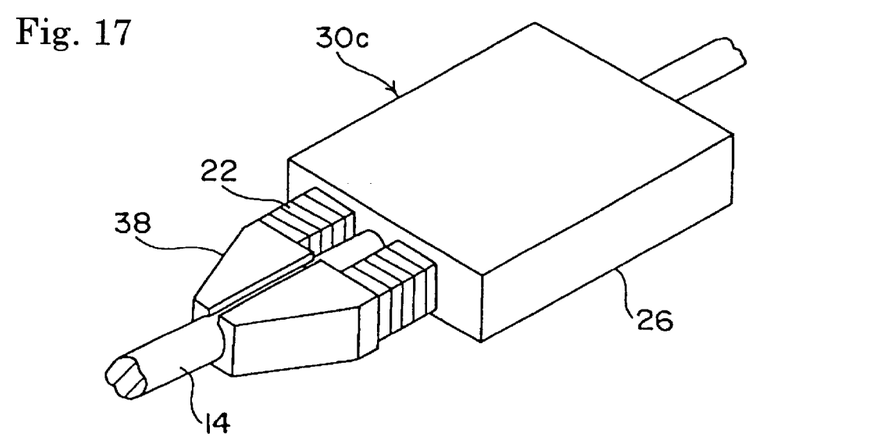
FIG. 17 is a perspective view of the important components of the driving apparatus of the fourth embodiment.

Driving apparatus 30c of a fourth embodiment, shown in FIGS. 15 through 17, is an example in which friction member 38 is simplified relative to the third embodiment described above. FIG. 15 shows three sides of friction member 38.

FIG. 16 is a perspective view of friction member 38, and FIG. 17 is a perspective view of the important components of driving apparatus 30c. Friction member 38 is essentially a triangular block. Piezoelectric elements 22 are connected to bottom surface 38a. Pass-through hole 38t, which passes through the center of the block, is formed such that it runs from top surface 38b to bottom surface 38a, and slit 38s is also formed through pass-through hole 38t such that pass-through hole 38t will elastically grasp shaft 14. In this embodiment, the friction member 38 may be made lightweight, highly elastic, highly movable and very hard by using an aluminum alloy treated with anode oxide coating.

Driving apparatus 10t of a fifth embodiment of the type in which the movable member moves along a groove will now be explained.

Figures 18, 19:
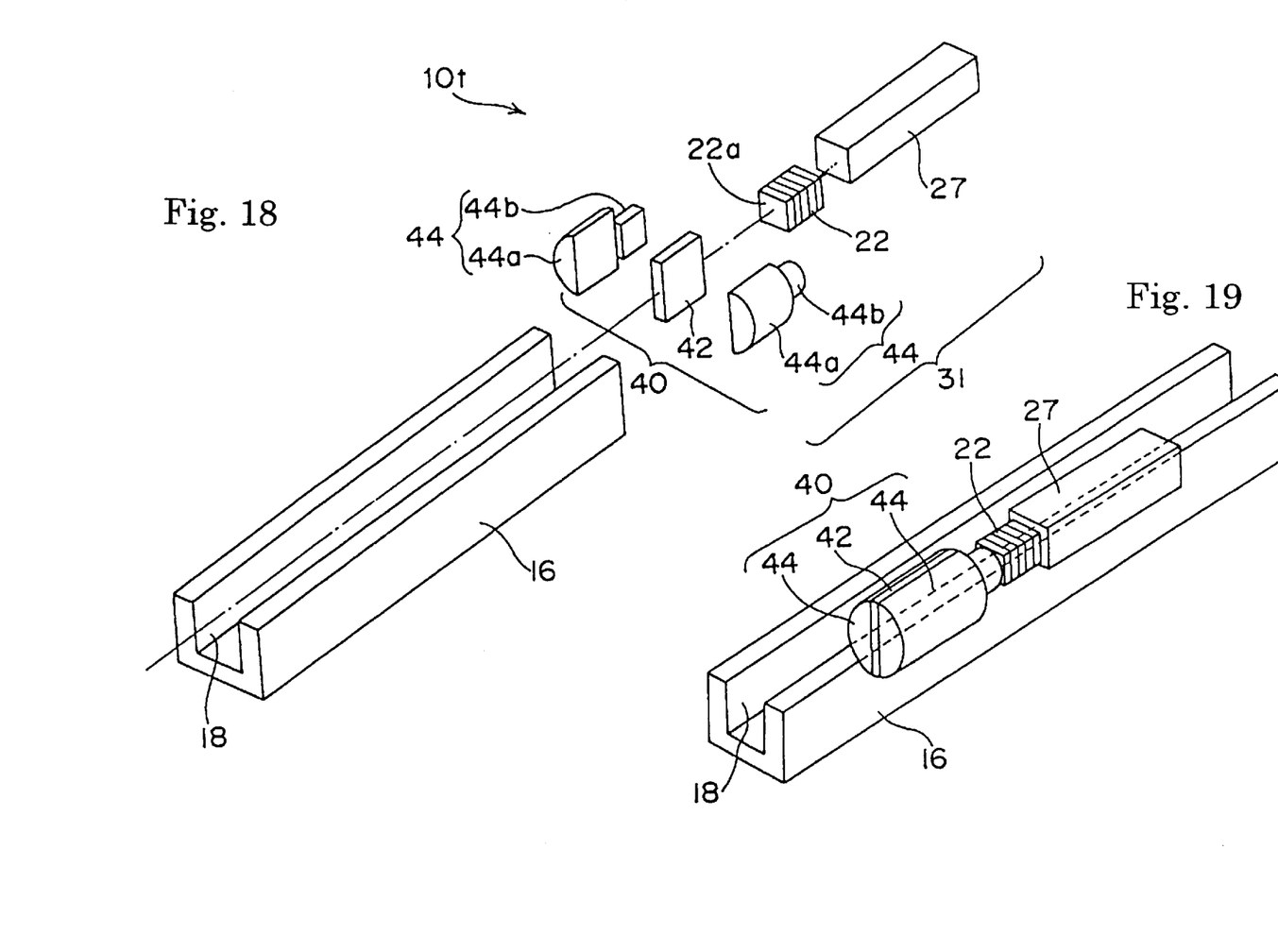
FIG. 18 is an exploded perspective view of a driving apparatus of a fifth embodiment pertaining to the present invention.
FIG. 19 is an overall perspective view of the driving apparatus shown in FIG. 18.

As shown in the exploded perspective view of FIG. 18 and the assembled perspective view of FIG. 19, this driving apparatus 10t is constructed in essentially the same manner as the conventional driving apparatus 10b. In driving apparatus 10t, movable unit 31 is located in guide groove 18 of guide block 16 that is fixed on a base, such that friction member 40 of movable unit 31 comes into movable contact with the vertical surfaces of guide groove 18. Movable unit 31 comprises piezoelectric element 22, movable member 27 that is connected to one expansion end of piezoelectric element 22, and friction member 40 that is connected to the other expansion end of piezoelectric element 22. The construction of friction member 40 differs from that of the friction member in the conventional driving apparatus 10b.

Figure 20:
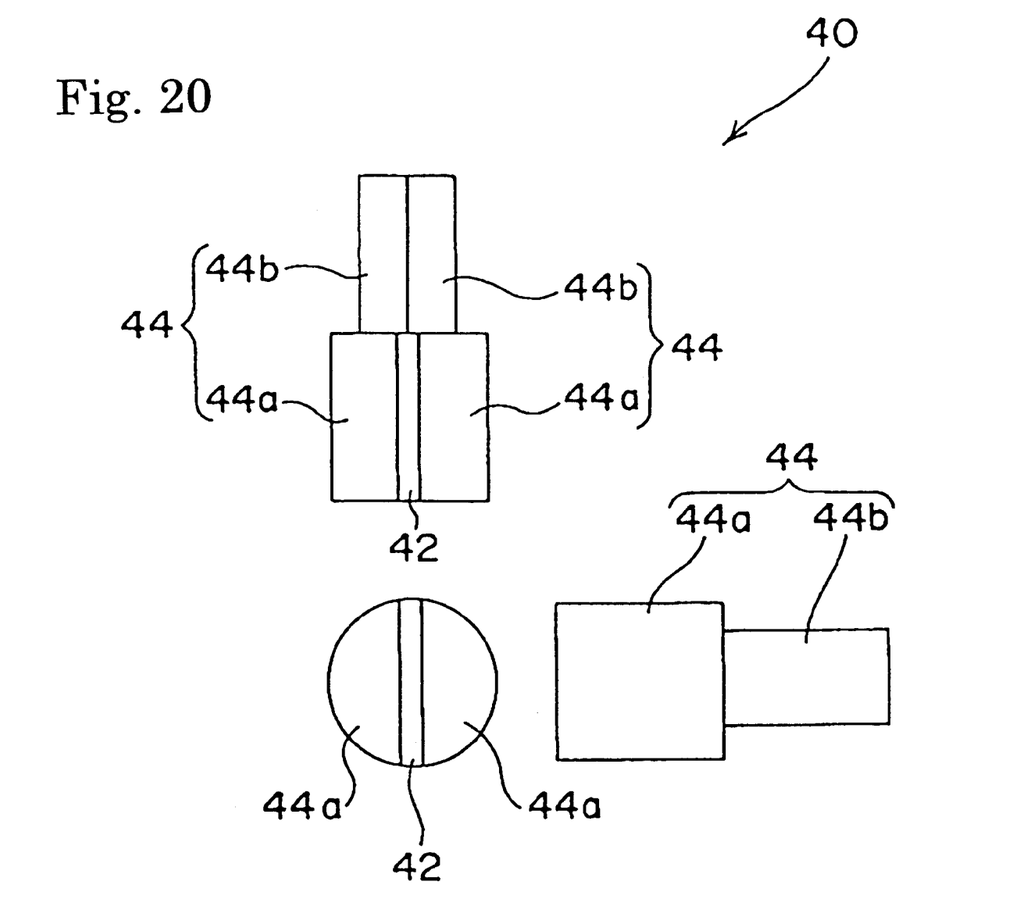
FIG. 20 is a drawing showing three sides of the frictional contact area of the driving apparatus shown in FIG. 18.

In other words, friction member 40 comprises elastic member 42, which is a rubber plate, and a pair of contact members 44 formed of carbon fiber, as shown in the three-sided drawing of FIG. 20. Each of the pair of contact members 44 comprises a base piece 44b having the configuration of a small cylinder split in the middle along the axis, and contact piece 44a having the configuration of a large cylinder split in the middle along the axis, the two of them being connected such that they share the same axis. Base pieces 44b of the pair of contact members 44 are fixed to each other, and the ends opposite from the ends connected to contact pieces 44a are fixed to expansion end 22a of piezoelectric element 22. For friction member 40, elastic member 42 is sandwiched between contact pieces 44a of the pair of contact members 44 such that (i) both contact pieces 44a face the vertical surfaces of guide groove 18, and (ii) elastic member 42 is parallel to the vertical surfaces of guide groove 18.

When movable unit 31 is placed in guide groove 18, contact pieces 44a of contact members 44 are elastically pressed against the vertical surfaces of guide grooves 18 due to the force of elastic member 42, and as a result, friction member 40 comes into frictional contact with guide block 16. Contact members 44 are made of carbon fiber, and thus experience virtually no elastic deformation along their length, i.e., in the directions of expansion and contraction of piezoelectric element 22. In other words, the elastic deformation stress vector of friction member 40 runs perpendicular to the directions of expansion and contraction of piezoelectric element 22, and no elastic deformation occurs in directions that are parallel to the directions of expansion and contraction of piezoelectric element 22. Therefore, this driving apparatus 10t can also be driven at a high rate of speed using a high frequency.

Friction member 40 is made lightweight, very rigid, highly movable and very hard by using carbon fiber. On the other hand, the optimal elasticity to create frictional force can be easily provided to contact members 44 by selecting the most suitable rubber characteristic for elastic member 42.

Figure 21:
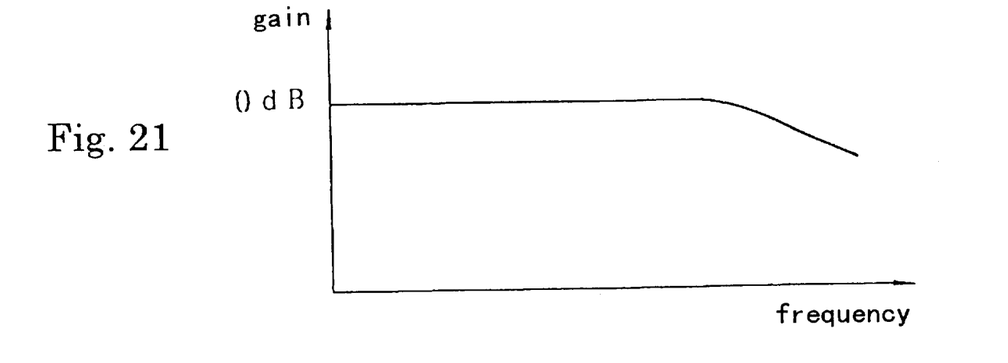
FIG. 21 is a graph showing the frequency-gain relationship in a driving apparatus of the present invention.
Figure 22:
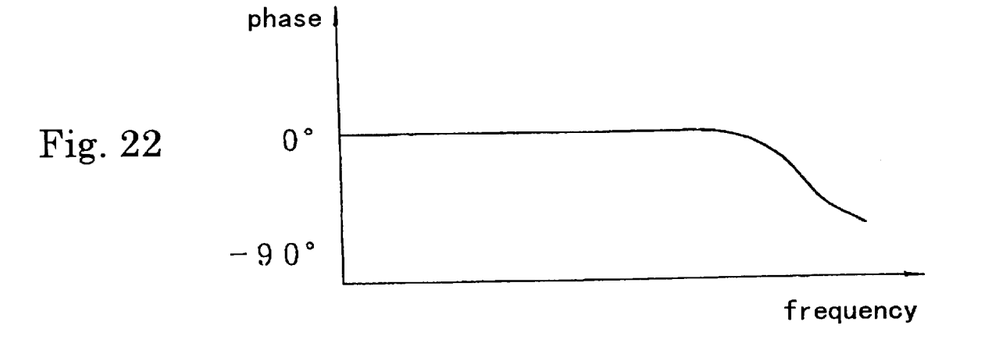
FIG. 22 is a graph showing the frequency-phase relationship in a driving apparatus of the present invention.
Figure 23:
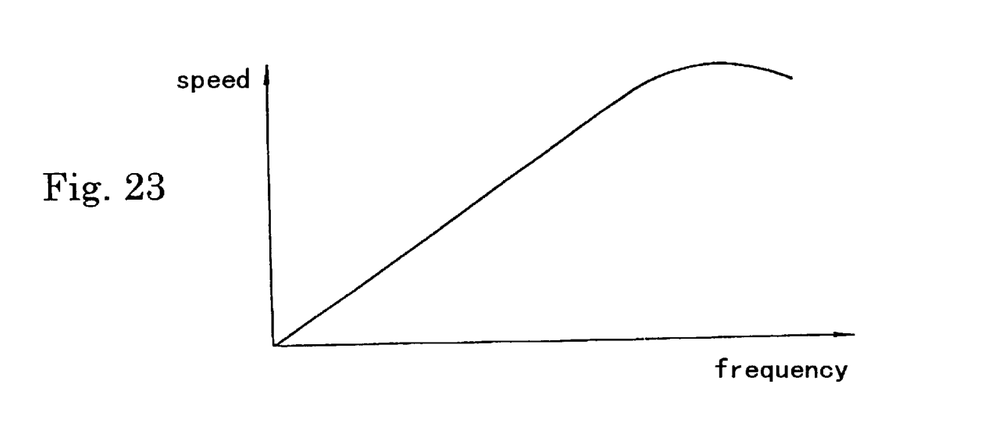
FIG. 23 is a graph showing the frequency-speed relationship in a driving apparatus of the present invention.

The effect of the present invention is shown in FIGS. 21 through 23 with regard to the driving apparatuses of the first through fifth embodiments. FIG. 21 is a graph showing the transfer function G=Y/X, just as with regard to FIG. 7, showing the function governing the transfer of change in position X of the piezoelectric element to change in position Y of the frictional contact point between friction member 32, 34, 36, 38 or 40 and shaft 14 or groove 18. The vertical axis represents the gain, while the horizontal axis represents the frequency of the voltage applied to the piezoelectric element. FIG. 22 is a graph showing the transfer function G=Y/X, just as with regard to FIG. 8, and the vertical axis represents the phase, while the horizontal axis represents the frequency of the voltage applied to the piezoelectric element. Comparing FIG. 21 with FIG. 7 regarding the conventional examples, the frequency level at which the gain starts to decrease is higher. Comparing FIG. 22 with FIG. 8 regarding the conventional examples, phase change does not occur until a higher frequency is applied. FIG. 23 is a graph showing the characteristic of the present invention in terms of the frequency (the horizontal axis) and the drive speed (the vertical axis). In other words, using driving apparatus 10s or 10t of the present invention, the drive frequency can be increased to increase the drive speed.

In the embodiments described above, a movable unit equipped with piezoelectric element 22 moves. However, it is also acceptable if the movable unit is fixed on a base and shaft 14 or 15 or guide block 16 moves instead. In addition, the present invention is not limited to said embodiments, but may be implemented in various other forms.

For example, as shown in U.S. Pat. No. 5,589,723, the same effect is obtained if the driving apparatus used is of the type in which one end of a piezoelectric element is fixed to a base, and a shaft, connected to the other end of the piezoelectric element, is moved back and forth such that a movable member that is in friction contact with the shaft is driven, or is of the type that performs rotation instead of linear movement. Needless to say, an electromechanical transducer other than a piezoelectric element may also be used in its place.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A driving apparatus comprising:
   an electromechanical transducer which extends and contracts in a predetermined direction, said transducer having first and second ends which are spaced apart from each other along said predetermined direction;
   a first member connected to said first end of said transducer;
   a driving member connected to the second end of said transducer, said driving member being movable only along said predetermined direction;
   a second member; and
   an elastic deforming mechanism frictionally connecting said driving member with said second member, whereby expansion and contraction of said transducer achieves relative movement between said first member and said second member along said predetermined direction;
      wherein said elastic deforming mechanism is constructed such that its elastic deformation stress vector is perpendicular to said predetermined directions and wherein said elastic deforming mechanism is adapted to maintain continuous frictional connection with said second member during said relative movement.

2. A driving apparatus according to claim 1, wherein said first member is fixed and said second member is driven by repetitive extension and contraction of said transducer.

3. A driving apparatus according to claim 1, wherein said second member is fixed and said first member is driven by repetitive extension and contraction of said transducer.

4. A driving apparatus according to claim 1, wherein said elastic deforming mechanism and said driving member are formed together as a single component.

5. A driving apparatus according to claim 4, wherein said elastic deforming mechanism comprises a pair of semicylindrical protrusions.

6. A driving apparatus according to claim 1, wherein said elastic deforming mechanism has a plurality of frictional contact areas, whereby a moment applied to said transducer by one of said plurality of frictional contact areas is kept in balance by a moment applied to said transducer by another of said plurality of frictional contact areas.

7. A driving apparatus according to claim 1, wherein said elastic deforming mechanism comprises an aluminum alloy.

8. A driving apparatus according to claim 7, wherein said elastic deforming mechanism is treated with anode oxide coating.

9. A method for driving a driving apparatus having an electromechanical transducer which has first and second ends spaced apart from each other along a predetermined direction and which extends and contracts in said predetermined direction, a first member connected to said first end of said transducer, a driving member connected to said second end of said transducer, and a second member frictionally coupled with said driving member, wherein the driving member is movable only in said predetermined direction, the method comprising the steps of:
   connecting said driving member with said second member by an elastic deforming mechanism so that an elastic deformation stress vector of said elastic deforming mechanism is perpendicular to said predetermined direction;
   extending and contracting the transducer in said predetermined direction to effect relative movement between said first member and said second member along said predetermined direction; and
   maintaining, during said extending and contracting, continuous frictional contact between said elastic deforming mechanism and said second member.

10. A driving apparatus which is capable of moving along a shaft member, said driving apparatus comprising:
    an electromechanical transducer which can extend and contract in a predetermined direction which is substantially parallel to said shaft member, said electromechanical transducer having a first end and a second end aligned along said predetermined direction;
    a movable member which is connected to the first end of said electromechanical transducer and which is slidably connected to said shaft member; and
    a driving member which is connected to the second end of said electromechanical transducer, said driving member having an elastic deforming mechanism for continuously frictionally connecting said driving member to said shaft member during said moving,
       wherein said elastic deforming mechanism can elastically deform in directions perpendicular to said predetermined direction without elastically deforming in directions that are parallel to said predetermined direction.

11. A driving apparatus in accordance with claim 10, wherein said elastic deforming mechanism comprises a pair of semicylindrical protrusions which extend parallel to and frictionally engage said shaft member.

12. A driving apparatus which is capable of moving along at least two parallel shaft members, said driving apparatus comprising:
    an electromechanical transducer which can extend and contract in a predetermined direction which is substantially parallel to said shaft members, said electromechanical transducer being positioned between two of said shaft members, said electromechanical transducer having a first end and a second end spaced apart from each other along said predetermined direction;
    a movable member which is connected to the first end of said electromechanical transducer and is slidably connected to each of said shaft members; and
    a driving member which is connected to the second end of said electromechanical transducer, said driving member having at least two elastic deforming mechanisms, each elastic deforming mechanism frictionally connecting said driving member to a respective one of said shaft members;
       wherein each of said elastic deforming mechanisms can elastically deform in directions perpendicular to said predetermined direction without elastically deforming in directions that are parallel to said predetermined direction.

13. A driving apparatus in accordance with claim 12, wherein each of said elastic deforming mechanisms comprises a pair of semicylindrical protrusions which frictionally engages a respective one of said shaft members.

14. A driving apparatus which is capable of moving along a shaft member, said driving apparatus comprising:
    at least two electromechanical transducers which are equally spaced about said shaft member, wherein each of said electromechanical transducers can extend and contract in a predetermined direction which is substantially parallel to said shaft member, wherein each of said electromechanical transducers has a first end and a second end spaced apart from each other along said predetermined direction;

a movable member which is connected to the first end of each of said electromechanical transducers and which is slidably connected to said shaft member; and a driving member which is connected to the second end of each of said electromechanical transducers, said driving member having an elastic deforming mechanism frictionally connecting said driving member to said shaft member, wherein said elastic deforming mechanism can elastically deform in directions perpendicular to said predetermined direction without elastically deforming in directions that are parallel to said predetermined direction.

15. A driving apparatus in accordance with claim 14, wherein said driving member comprises a pair of semicylindrical protrusions located in a center portion of said driving member and aligned between said electromechanical transducers.

16. A driving apparatus in accordance with claim 14, wherein said driving member has a generally triangular block shape having a wide bottom surface and a narrow top surface with said wide bottom surface being in contact with said electromechanical transducers, and wherein said elastic deforming mechanism comprises a hole passing through said driving member from said wide bottom surface to said narrow top surface with an outwardly opening slit extending along said hole, whereby said shaft member is received in said hole so as to frictionally engage said elastic deforming mechanism.

17. A driving apparatus capable of moving along a groove in a grooved member, said driving apparatus comprising:

an electromechanical transducer which can extend and contract in a predetermined direction which is parallel to said groove, said electromechanical transducer having a first end and a second end spaced apart from each other along said predetermined direction;

a movable member which is connected to the first end of said electromechanical transducer and which is slidably aligned in said groove; and a friction member which is connected to the second end of said electromechanical transducer, said friction member comprising an elastic member and a pair of contact members located on opposite sides of said elastic member, wherein during said moving, the pair of contact members of said friction member continuously frictionally contact walls of said groove and form an elastic deformation stress vector which perpendicularly crosses said predetermined direction.

* * * * *